(12) United States Patent
Solberg, Jr. et al.

(10) Patent No.: US 7,674,307 B2
(45) Date of Patent: Mar. 9, 2010

(54) SELF SUPPORTED FLUID FILTER

(75) Inventors: Charles H. Solberg, Jr., Tower Lakes, IL (US); Adam Anderson, Palatine, IL (US)

(73) Assignee: Solberg Manufacturing, Inc., Itasca, IL (US)

( * ) Notice: Subject to any disclaimer, the term of this patent is extended or adjusted under 35 U.S.C. 154(b) by 192 days.

(21) Appl. No.: 11/574,966

(22) PCT Filed: Sep. 16, 2005

(86) PCT No.: PCT/US2005/033305

§ 371 (c)(1), (2), (4) Date: Sep. 24, 2007

(87) PCT Pub. No.: WO2006/034107

PCT Pub. Date: Mar. 30, 2006

(65) Prior Publication Data

US 2008/0066437 A1 Mar. 20, 2008

Related U.S. Application Data

(60) Provisional application No. 60/610,984, filed on Sep. 16, 2004.

(51) Int. Cl.
*B01D 46/00* (2006.01)

(52) U.S. Cl. .............................. 55/497; 55/498; 55/502; 55/521; 55/524; 55/DIG. 5

(58) Field of Classification Search .................. 55/497, 55/498, 502, 521, 357, 529, 500, DIG. 42; 210/493.1, 493.5, 457, 493.2, 509
See application file for complete search history.

(56) References Cited

U.S. PATENT DOCUMENTS

| | | | | |
|---|---|---|---|---|
| 2,880,860 A | * | 4/1959 | Rhoades et al. | 242/160.4 |
| 3,194,283 A | | 7/1965 | Young et al. | |
| 3,410,062 A | * | 11/1968 | Hart | 55/497 |
| 3,465,413 A | | 9/1969 | Rosaen et al. | |
| 3,873,288 A | * | 3/1975 | Wachter et al. | 55/497 |
| 4,439,321 A | * | 3/1984 | Taki et al. | 210/493.1 |

(Continued)

FOREIGN PATENT DOCUMENTS

EP     1 136 112     9/2001

(Continued)

OTHER PUBLICATIONS

Copy of International Search Report of parent international application No. PCT/US05/033305 (2006).

(Continued)

*Primary Examiner*—Minh-Chau T Pham
(74) *Attorney, Agent, or Firm*—James B. Conte

(57) ABSTRACT

A self supported cylindrical corrugated filter. The corrugations of the filter define a first and second end. Two arcuate side walls join the first and second end. The filter has a substantially planar front surface and a substantially planar rear surface. The front and rear surfaces extend the length of the filter. The arcuate side walls have a plurality of overlapping folded flaps. Each one of the plurality of flaps is joined to at least one adjacent flap from the plurality of flaps to form the self supported filter.

14 Claims, 2 Drawing Sheets

U.S. PATENT DOCUMENTS

| | | | |
|---|---|---|---|
| 4,522,719 A * | 6/1985 | Kuwajima et al. | 210/457 |
| 4,746,432 A * | 5/1988 | Taki et al. | 210/493.5 |
| 5,178,760 A | 1/1993 | Solberg, Jr. | |
| 5,230,455 A * | 7/1993 | Price | 226/88 |
| 2003/0056479 A1* | 3/2003 | LeMaster | 55/497 |
| 2007/0157589 A1* | 7/2007 | Haberkamp et al. | 55/498 |
| 2008/0066434 A1* | 3/2008 | Kuempel et al. | 55/357 |

FOREIGN PATENT DOCUMENTS

| | | |
|---|---|---|
| FR | 2 147 228 | 3/1973 |
| GB | 1 367 226 | 7/1972 |
| GB | 2 252 922 | 8/1992 |

OTHER PUBLICATIONS

Supplementary EP Search Report EP 05 79 9711 dated Oct. 2, 2008 (10 pages).

* cited by examiner

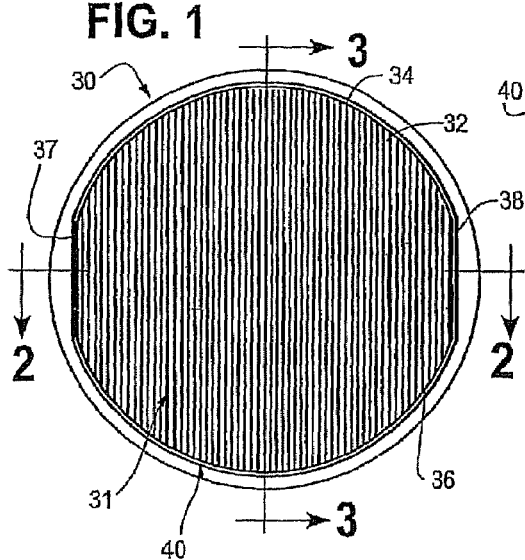
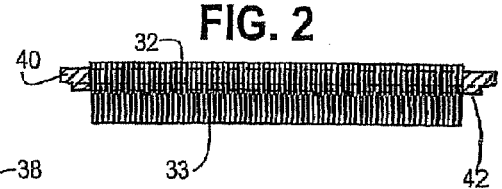
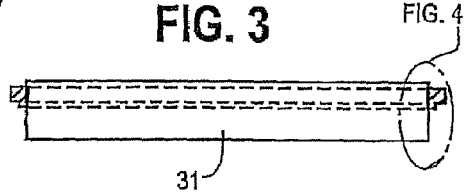
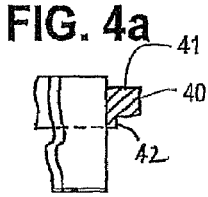
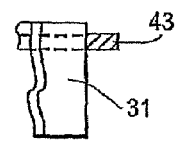
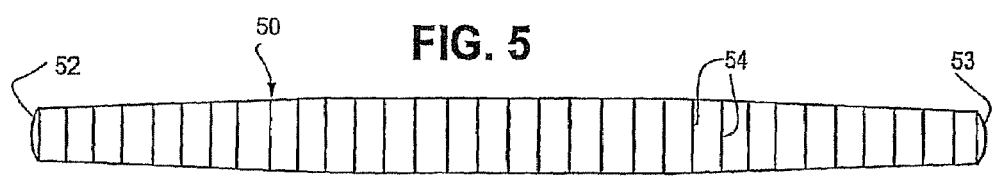
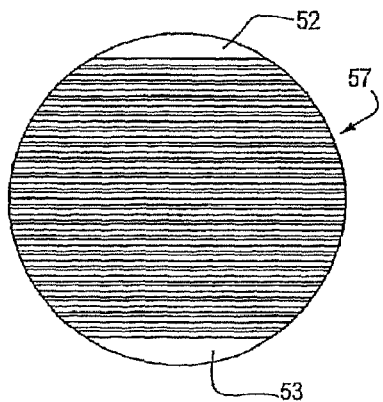
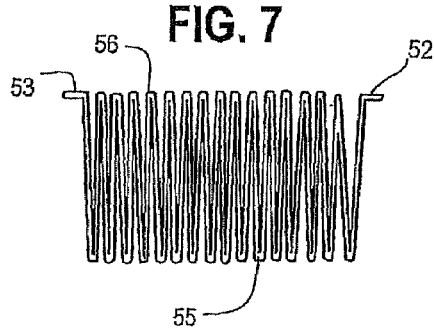

SELF SUPPORTED FLUID FILTER

This application claims priority from U.S. Application 60/610,984 filed Sep. 16, 2004, the entirety of which is incorporated herein by reference.

BACKGROUND OF THE INVENTION

The present invention relates a filter element that is ultrasonically sealed to provide a self sealed cylindrical corrugated fluid filter.

DESCRIPTION OF RELATED ART

Cellulose air filters can be made according to our U.S. Pat. No. 5,178,760 wherein a cylindrical corrugated filter media has molded thereon in a sealing relationship a container, so that the assembly is ultimately sold as the an air filter element that can be used in a filter housing.

SUMMARY OF THE INVENTION

The present invention provides a self sealed cellulose based air or gas filter element which does not have a separate sidewall molded thereon and can be directly inserted into a filter canister. The filter element can also be described as a self supported filter cartridge or can be described as a self contained filter cartridge.

The present invention provides a self-supported cylindrical corrugated filter element having corrugations defining a first and second end, two arcuate side walls joining the first and second ends, a substantially planar front surface, a substantially planar rear surface, said front and rear surfaces extending the length of the filter, the arcuate side walls having overlapping folded flaps joined without the use of a separate applied adhesive, i.e. the flaps are ultrasonically welded to provide our self-supported filter cartridge or element. The flaps can thus be considered non-adhesively joined.

The present invention further provides the above self-supported cylindrical corrugated filter cartridge wherein on each side of the filter there is a first group of the overlapping flaps folded clockwise and a second group of the overlapping flaps folded counter-clockwise.

The present invention also provides the above described self-sealed cylindrical corrugated filter cartridge that has an indentation therearound spaced a predetermined distance form one end thereof to provide means for holding an o-ring type seal to permit the self-supported cylindrical corrugated filter cartridge to fit in a desired filter container or housing.

The present invention also provides an filter blank that can be ultrasonically welded to provide the above self-supported cylindrical corrugated filter cartridges.

The present invention also provides a method of preparing the self-supported cylindrical corrugated fluid filter by preparing an ultrasonically weldable filter blank that can be corrugated and formed into a substantially cylindrical filter, corrugating the blank to form a substantially cylindrical fluid filter media having two arcuate side walls with a plurality of corrugation ends, supplying a first ultrasonic welding retainer having first corrugation fingers, sized to fit the corrugations of at least some of the corrugations in one end of the substantially cylindrical filter element, supplying a second ultrasonic welding retainer having second corrugation fingers sized to fit the corrugations of at least some of the corrugations in the other end of the substantially cylindrical fluid filter, placing the first fingers into the corrugations in the one end of the substantially cylindrical air filter, placing the second fingers into the corresponding corrugations in the other end of the substantially cylindrical fluid filter, contacting the corrugation ends that have first and second fingers therein with an ultrasonic device such as an arm to fold the corrugation ends (flaps) to provide the overlapping side wall flaps and to ultrasonically weld the overlapping side wall flaps to provide the self-supported cylindrical corrugated fluid filter cartridge.

BRIEF DESCRIPTION OF THE DRAWINGS

The drawings are provided to illustrate some of the embodiments of the disclosure. It is envisioned that alternate configurations of the embodiments of the present disclosure may be adopted without deviating from the disclosure as illustrated in these drawings.

FIG. 1 discloses a top plan view of our self-supported cylindrical corrugated fluid filter cartridge having its filter media bordered by a pair of seals.

FIG. 2 discloses a side cross sectional view of the filter cartridge of FIG. 1 taken along the view lines A-A.

FIG. 3 is a cross sectional view of FIG. 1 taken along the view lines B-B.

FIG. 4a is a blow-up of the detail shown in FIG. 3.

FIG. 4(b) is the same as FIG. 4 except using an O-ring seal.

FIG. 5 is a plan view of the filter blank used to prepare the filter of the present invention.

FIG. 6 is a top view of the filter media prior to folding and overlapping the ends of the corrugations.

FIG. 7 is an elevational side view of the filter of FIG. 6.

DETAILED DESCRIPTION

Figure 8:
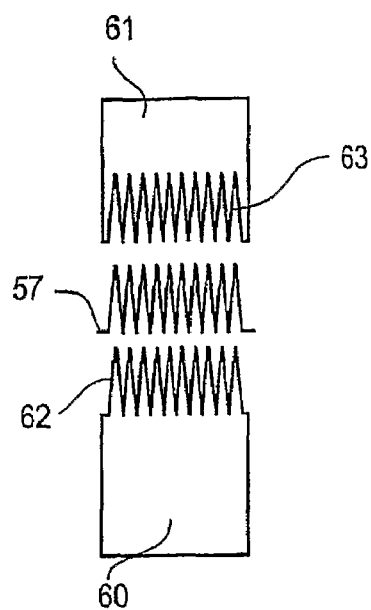
FIG. 8 is a representative view of the filter media positioned to be placed between a filter media retainer, wherein the end portions of the pleats forming the curvilinear perimeter of the filter media are to be folded over and welded to each other.

Referring to the FIGS. 1-4, our self-supported cylindrical corrugated fluid filter cartridge 30 has an ultrasonic sealed corrugated filter media 31. The filter media is preferably a cellulose based media that has some plastic mixed with the paper material to allow it to be bound to itself by ultrasonic welding. The filter cartridge or element 30 has corrugations defining an upper or first end 32 and a lower or second end 33. The two ends are joined by two arcuate side walls 34 and 36 and a front planar portion 37 and rear planar portion 38. The side walls are provided with a closed filter surface to substantially prevent air from freely passing through without being filtered. The closed filter surface is provided by having side walls comprised of ultrasonically welded overlapping flaps as hereinafter described.

As shown in FIG. 4a, the cartridge has a seal 40. The seal 40 has an upper flange section 41 and a lower cylindrical body portion 42. The seal 40 is generally fastened onto the media by press fitting thereon or alternatively also being attached by adhesive with or without the press fit. Our FIG. 4(b) shows an alternative seal 43 that can be used. Seal 43 is an o-ring which is fitted into a groove formed on the cellulose side walls 34, 36 and front and rear walls 37, 38. As stated above these seals permit our filter cartridge 30 to be tightly fitted into a fluid filter housing. Since our filter cartridge does not require a separate plastic side wall before it can be used, it is highly economical and environmentally friendly.

Referring to FIGS. 5-10 there is shown how our filter cartridge is manufactured. FIG. 5 shows a flat filter member 50 that tapers along both edges from its widest dimension at its midsection toward its opposite ends 52 and 53, which are rounded to form a tongue-like flange. The illustrated blank is merely representative and is not to the scale of the folded filter elements 50 shown in FIGS. 6 and 7, however, the transverse lines 54 shown in FIG. 5 are representative of fold lines for lower folds 55 and upper folds 56. The distance indicated by the arrows B-B in FIG. 5 is representative of the amplitude or height of the folds and will be strongly controlling in determining the total area of the filter element.

Referring to FIGS. 6 and 7 the blank 50 is appropriately folded to form the cylindrical filter element 57 that has the end tongue-like flanges 52 and 53.

Figure 10:
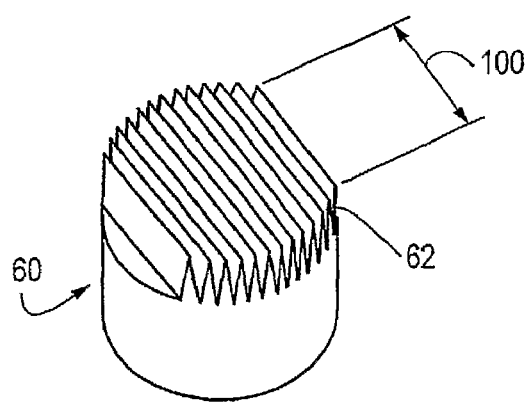
FIG. 10 is a perspective view of the lower retainer portion shown in FIG. 9.

Referring to FIGS. 8 and 10 suitable filter retainers or cores 60 and 61 are used to produce the cartridge 30. The two filter cores are substantially identical and therefore only one will be described. Although two cores are used, it would be possible to use only one core. FIG. 10 shows the lower or first ultrasonic welding core 60 having first corrugation fingers 62 sized to fit the corrugations formed by folds 55 and the second corrugation fingers 63 are sized to fit the corrugations formed by the folds 56. The width, as measured along direction 100, of the each of the fingers 62 and 63 are such that they are a predetermined amount less that of the width, as measured along direction 101, of the respective folds 55 and 56. Put another way, the diameter of the cellulose media is greater than that of the core. Therefore, hereinafter set forth, the ends of the corrugations formed by the folds can be folded to provide overlapping flaps that can be ultrasonically welded. As previously noted, the blank 50 is preferably a cellulose based material such as paper that has a plastic thermo setting resin added thereto so that it can be bound to itself by ultrasonic welding.

Figure 9:
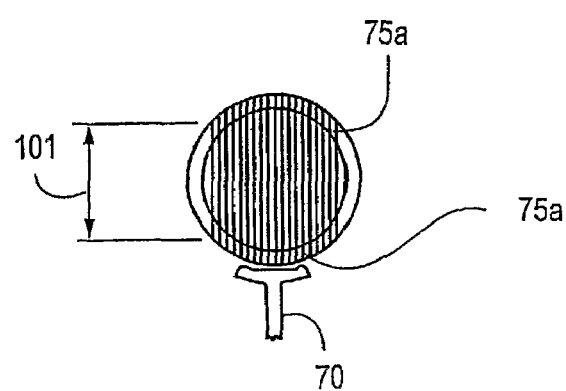
FIG. 9 is a top-sectional view showing the filter media mounted in the retainer, a welding horn is positioned to weld the open end portion of the pleats one to the other.
Figure 11:
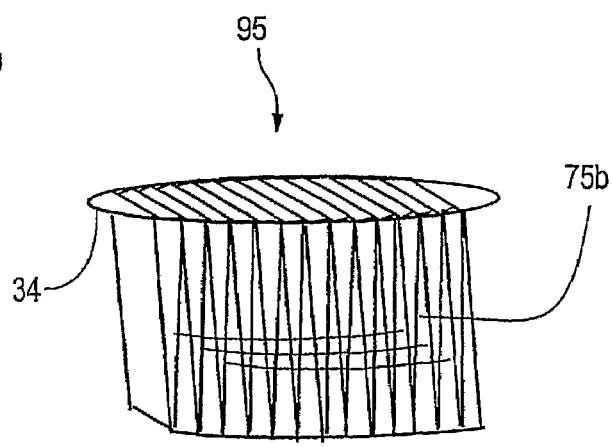
FIG. 11 is a perspective view of the welded filter element of FIG. 1 illustrating the open end portions of the corrugations folded over and welded to each other.

To prepare the cartridge 30 the core fingers 62 and 63 are placed into opposite ends of the filter element 57 as shown in FIG. 8. When they are fully inserted, the filter element is thus intermeshed and sealed between both the fingers 62 and 63 of the lower and upper retainer cores. The upper and lower fingers 62 and 63 are thus only separated by the thickness of the filter media and leave unengaged corrugations ends 75a. As illustrated in FIG. 9, the retainer/positioner cores 60 and 61 rotate and an ultrasonic welding device, has a welding arm and a ultrasonic welding horn head 70 that indexes in and out causing the horn to fold over the open end portions of the filter element 57. Thus the ends of the filter element 75a extending beyond the ends of the fingers 62 and 63 are folded over and the folds overlap each other and the overlapping folds are sonically welded one to the other by the ultrasonic welding horn which is adjacent to the perimeter of the cylindrical retainer/positioner cores to produce the ultrasonically welded filter cartridge 75 having the welded flaps 75b are shown in FIG. 11.

A second material may be wrapped around the sealed side walls and front and rear walls and welded thereto to make the formed media more rigid and visually appealing.

As an example of our filter 30 the diameter of the flange 41 is about 594 mm, the length of the filter from its top to its bottom is about 83 mm, the distance between the flange top surface and the top of the filter is about 8 mm, the thickness of the flange is about 57 mm, and the diameter of the filter element 75 is about 550 to 563 mm.

The filter paper utilized is between 99% and 99.7% efficient at two (2) microns. The filter paper should be cut and fabricated such that it has a ratio of cubic meters per hour/ square meter of between 370 and 555 while providing a pressure drop below 250 pascals or 2.5 milibars. The paper should be able to accommodate a flow rate of air between 416-3000 cubic meters per hour. The filter paper is formed from a cellulose media having sufficient thermo resin to allow for proper ultrasonic welding.

Of course, other modifications than those discussed above may be used in producing a self-supported cylindrical corrugated fluid filter without departing from the scope of the accompanying claims. Also unless limited by the prior art the term cylindrical is meant to cover any shaped filter which is to be used as an air intake filter that is to be inserted in a an apparatus the utilizes a closed air intake filter holder.

We claim:

1. A self-supported cylindrical corrugated filter comprising:
   corrugation folds defining an upper first and a lower second end,
   two arcuate side walls joining the upper first end and lower second end, said arcuate side walls formed by ends of the corrugation folds
   a substantially planar front surface,
   a substantially planar rear surface,
   said front and rear surfaces extending the length of the filter,
   said ends of said corrugation folds are folded over to form a plurality of overlapping folded flaps, wherein each one of said plurality of folded over flaps is joined to at least one adjacent folded over flap from said plurality of folded over flaps to form a self-supported filter.

2. The self-supported cylindrical corrugated filter of claim 1 wherein on each side of the filter a first group of the overlapping flaps are folded clockwise and a second group of the overlapping flaps are folded counter-clockwise.

3. A method of preparing a self-supported cylindrical corrugated gas filter comprising: preparing an ultrasonically weldable corrugatable air filter blank that can be formed into a substantially cylindrical filter, corrugating said blank to form a substantially cylindrical air filter having two arcuate side walls with a plurality of corrugation ends, folding the corrugation ends to provide overlapping side wall flaps, and joining the overlapping side wall flaps to provide the self-supported cylindrical corrugated air filter.

4. The self-supported cylindrical corrugated filter of claim 1 wherein said each of one of said plurality of flaps is joined to at least one adjacent flap by a glue.

5. The self-supported cylindrical corrugated filter of claim 4 wherein said glue is a plastic thermo setting resin and said flaps are formed from a filter paper made of a material including said plastic thermo setting resin.

6. The self-supported cylindrical corrugated filter of claim 5 wherein the overlapping flaps are sonically welded together.

7. A sonically weldable corrugatable air filter blank that can be formed into a self-supported substantially cylindrical air filter comprising:
   a flat filter blank, said flat filter blank being tapered from its mid-section towards its end so that when said flat filter blank is corrugated, the corrugated filter blank provides a segmented cylindrical corrugated filter having corrugated folds defining top and bottom surfaces, two arcuate side walls, and substantially planar front and rear surfaces, said arcuate side walls formed ends of said corrugated folds, at least a portion of said ends of said corrugated folds are folded over to form a plurality of overlapping folded flaps wherein each one of said plurality of folded over flaps is joined to at least one adjacent folded over flaps is joined to at least one adjacent folded over flap from said plurality of folded over flaps to provide the self-supported air filter.

8. The self-supported cylindrical corrugated filter of claim 1 or 3 wherein a seal is attached around the filter adjacent one end of the filter and over the joined flaps.

9. The method of preparing a self-supported cylindrical corrugated gas filter of claim 8 further comprising; providing a glue, and joining said flaps together with said glue.

10. The method of claim 9 wherein said glue is a plastic thermo setting resin, and said method further comprises providing said flaps in the form of a filter paper with plastic thermo setting resin imbedded therein and activating said resin by ultrasonically welding said flaps to join the overlapping side wall flaps together to provide the self-supported cylindrical corrugated air filter.

11. The method of claim 10 comprising: supplying a first ultrasonic welding core having first corrugation fingers sized to fit the corrugations of at least some of the corrugations in one end of the substantially cylindrical filter, supplying a second ultrasonic welding core having second corrugation fingers sized to fit the corrugations of at least some of the corrugations in the other end of the substantially cylindrical filter, placing the first fingers into the corrugations in the one end of the substantially cylindrical filter, placing the second fingers into the corresponding corrugations in the other end of the substantially cylindrical filter, contacting the corrugation ends that have first and second fingers therein with an ultrasonic device to fold the corrugation ends to provide the overlapping side wall flaps and to ultrasonically weld the overlapping side wall flaps.

12. The method of claim 11 wherein the folding and ultrasonic welding is done in several steps.

13. The method of claim 12 wherein some of the folding and ultrasonic welding is in a clockwise direction and some of the folding and ultrasonic welding is in a counter-clockwise direction.

14. The method of claim 11 further comprising attaching a seal on the self supported air filter adjacent to one end of the filter and over the welded flaps.

* * * * *